United States Patent
Oda et al.

(10) Patent No.: US 11,067,042 B2
(45) Date of Patent: Jul. 20, 2021

(54) ENGINE INTAKE SYSTEM

(71) Applicant: Mazda Motor Corporation, Hiroshima (JP)

(72) Inventors: Yusuke Oda, Aki-gun (JP); Tomomi Watanabe, Aki-gun (JP); Junsou Sasaki, Aki-gun (JP); Yuichiro Tanaka, Aki-gun (JP); Takuya Yamada, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/934,035

(22) Filed: Jul. 21, 2020

(65) Prior Publication Data
US 2021/0033050 A1   Feb. 4, 2021

(30) Foreign Application Priority Data
Aug. 1, 2019   (JP) ............................. JP2019-142057

(51) Int. Cl.
*F02M 35/10*   (2006.01)
*F02M 26/17*   (2016.01)
*F02D 9/08*   (2006.01)

(52) U.S. Cl.
CPC ......... *F02M 35/10144* (2013.01); *F02D 9/08* (2013.01); *F02M 26/17* (2016.02); *F02M 35/10222* (2013.01); *F02M 35/10236* (2013.01); *F02M 35/10262* (2013.01); *F02M 35/10314* (2013.01)

(58) Field of Classification Search
CPC ............ F02M 35/10144; F02M 26/17; F02M 35/10222; F02M 35/10236; F02M 35/10262; F02M 35/10314; F02M 26/18; F02M 26/11; F02M 26/19; F02D 9/08
See application file for complete search history.

(56) References Cited

U.S. PATENT DOCUMENTS

| | | | |
|---|---|---|---|
| 9,273,652 B2 * | 3/2016 | Ito | F02M 35/10268 |
| 2014/0150759 A1 * | 6/2014 | Song | F02M 26/19 |
| | | | 123/568.19 |
| 2014/0238364 A1 * | 8/2014 | Beyer | F02M 35/10222 |
| | | | 123/568.21 |
| 2015/0267650 A1 * | 9/2015 | Siuchta | F02M 26/10 |
| | | | 60/605.2 |

FOREIGN PATENT DOCUMENTS

JP   2017-031964 A   2/2017

\* cited by examiner

*Primary Examiner* — Xiao En Mo
(74) *Attorney, Agent, or Firm* — Xsensus LLP (57) ABSTRACT

An intake system of an engine supplies gas at least containing fresh air to each cylinder. The system includes an EGR passage that communicates with an internal space of a downstream intake passage and introduces some EGR gas into the downstream intake passage. The EGR passage includes a projected section in a substantially polygonal or cylindrical shape that is projected to the internal space of the downstream intake passage. The projected section is formed in such a shape that a projection length H1 in an outer circumferential surface on an upstream side is longer than a projection length H2 in an outer circumferential surface on a downstream side.

20 Claims, 8 Drawing Sheets

ENGINE INTAKE SYSTEM

CROSS-REFERENCE TO RELATED APPLICATION

The present application claims priority to JP 2019-142057, filed Aug. 1, 2019, the entire contents of which are incorporated herein by reference.

TECHNICAL FIELD

The present disclosure relates to an engine intake system including an exhaust gas recirculation system that introduces some exhaust gas into an intake passage, through which fresh air flows, for example.

BACKGROUND ART

Conventionally, there are vehicles such as automobiles that include an exhaust gas recirculation system that introduces some exhaust gas into an intake passage, through which fresh air flows, in order to reduce nitrogen oxides in the exhaust gas and improve fuel economy.

It has been known that, in an engine intake system that includes such an exhaust gas recirculation system, moisture contained in exhaust gas recirculation gas (hereinafter referred to as "EGR gas") is condensed in the intake passage at a relatively low temperature. For example, when an engine is stopped when the outside temperature is below freezing, condensation water (dew) becomes frozen in the intake passage and possibly gives rise to performance problems or even equipment damage.

In view of the above, various techniques of suppressing the freezing of moisture in the EGR gas have been proposed. For example, in Patent document 1, an EGR passage (an EGR gas introduction channel) through which the EGR gas is introduced is provided along a wall surface of the intake passage (an intake manifold). In this way, in Patent document 1, the intake passage can be warmed. Thus, even in the case where the moisture contained in the EGR gas is condensed, the dew, or condensation water caused by warm moist air coming into contact with a surface whose temperature is below the dew point, can flow down to a downstream portion of the intake passage before being frozen.

Moreover, in Patent document 1, the EGR passage projects into an internal space of the intake passage, and a collision wall with which the EGR gas collides is provided at a tip of the EGR passage. As a result, in Patent document 1, the EGR gas is diffused in the intake passage to promote mixture of the fresh air and the EGR gas.

However, as recognized by the present inventor, in the internal space on an uppermost stream side of the intake passage, a negative-pressure region having a relatively negative pressure is generated adjacent to a downstream side of a throttle valve by a flow of the fresh air that has flowed through the throttle valve. Thus, in Patent document 1, the EGR gas, which has been diffused by the collision wall of the EGR passage, partially flows toward the throttle valve as drawn the by the negative-pressure region.

Then, in the case where some of the EGR gas is accumulated in the negative-pressure region near the throttle valve and the engine is stopped a below freezing point environment, there is a possibility that the moisture contained in the EGR gas condenses on the throttle valve, and then possibly freezes to possibly inhibit proper operation of the throttle valve.

PRIOR ART DOCUMENT

Patent Document

[Patent document 1] JP-A-2017-31964

SUMMARY

Problems to be Solved by the Disclosure

In view of the above-described and other problems, the present disclosure provides an engine intake system capable of inhibiting a flux of EGR gas toward a throttle valve by controlling the flux of the EGR gas in an internal space of an intake passage.

Means for Solving the Problems

According to one embodiment, the present disclosure describes, among other things, an engine intake system supplies gas containing fresh air to a cylinder of an engine, the engine intake system includes a throttle valve that regulates an intake amount of the fresh air; an intake passage having an internal space in which the fresh air that passed through the throttle valve is introduced into the cylinder of the engine; and an EGR passage that communicates with the internal space of the intake passage and introduces at least some exhaust gas as EGR gas into the intake passage. The EGR passage includes a projected section having a substantially polygonal or at least partially cylindrical shape that extends into the internal space of the intake passage, and an upstream lateral surface of the projected section has a projection length that is longer than a projection length on a downstream lateral surface of the projected section.

According to the present embodiment, it is possible to inhibit a flux of the EGR gas toward the throttle valve by controlling the flux of the EGR gas in the internal space of the intake passage.

More specifically, the projected section of the EGR passage is formed in the substantially polygonal or cylindrical shape in which the projection length on the upstream lateral surface is longer than the projection length on the downstream lateral surface. Accordingly, in the projected section of the EGR passage, the upstream lateral surface can function as a protective wall against a negative-pressure region that is generated adjacent to the throttle valve.

As a result, even in the case where the projected section of the EGR passage is provided at a position near the throttle valve, the engine intake system can inhibit the EGR gas from being attracted to the negative-pressure region. Thus, the engine intake system can introduce the EGR gas into the intake passage in a manner to flow along a flow of the fresh air that flows down toward a downstream portion of the intake passage.

Therefore, the engine intake system can inhibit the flux of the EGR gas toward the throttle valve by controlling the flux of the EGR gas in the internal space of the intake passage. Furthermore, the projected section of the EGR passage can be provided in a further upstream portion of the intake passage. Therefore, compared to a case where the projected section of the EGR passage is provided in the downstream portion of the intake passage, the engine intake system can further reliably mix the fresh air and the EGR gas.

As an aspect of the present disclosure, the projected section of the EGR passage may be formed in the substantially cylindrical shape.

According to this configuration, the engine intake system can cause the fresh air to smoothly flow down along a circumferential surface of the projected section. Thus, compared to a projected section in a substantially rectangular shape, for example, the engine intake system can suppress intake resistance of the fresh air.

Furthermore, since the negative-pressure region is generated on a downstream side of the projected section by a flow of the fresh air, the engine intake system can reliably deliver the EGR gas from the projected section toward the downstream portion of the intake passage.

Therefore, the engine intake system can further inhibit the flux of the EGR gas toward the throttle valve and can reliably cause the EGR gas, which is introduced into the intake passage, to flow down to the downstream portion of the intake passage.

As an aspect of the present disclosure, a direction along a valve shaft of the throttle valve may be set as a valve shaft direction, and the projected section of the EGR passage may be formed to be projected in a direction that crosses the valve shaft direction and to have the projection length that does not overlap the valve shaft at the time when the downstream portion of the intake passage is seen from the throttle valve.

According to this configuration, in the engine intake system, it is possible to suppress a ratio of an area of the projected section to an opening area of the intake passage to be low when the downstream portion of the intake passage is seen from the throttle valve. Thus, the engine intake system can further suppress the intake resistance of the fresh air.

Furthermore, when the downstream portion of the intake passage is seen from the throttle valve, the projection length of the projected section can be suppressed in comparison with a projected section having a projection length that overlaps the valve shaft. Thus, in the engine intake system, a tip of the projected section can be positioned near a circumferential surface of the intake passage where a flow velocity of the fresh air is relatively high.

Therefore, the engine intake system can reliably merge the EGR gas with the flow of the fresh air that flows toward the downstream portion of the intake passage at the relatively high flow velocity.

In this way, the engine intake system can further reliably cause the EGR gas, which is introduced into the intake passage, to flow down to the downstream portion of the intake passage.

As an aspect of the present disclosure, a porous member that covers the EGR passage may be provided.

The porous member means a sound absorbing material, a sound insulator, or a thermal insulator, for example.

According to this configuration, the engine intake system can retain heat in the EGR passage. Thus, it is possible to introduce the EGR gas, a temperature of which is suppressed from being reduced, toward the downstream portion of the intake passage.

In this way, the engine intake system can further suppress condensation of moisture (e.g., water vapor) contained in the EGR gas in the intake passage. Therefore, the engine intake system can further reliably introduce the EGR gas containing the moisture into the cylinder of the engine.

Advantages of the Disclosure

The present disclosure provides an engine intake system capable of inhibiting the flux of the EGR gas toward the throttle valve by controlling the flux of the EGR gas in the internal space of the intake passage.

MODES FOR CARRYING OUT THE EMBODIMENTS

A description will hereinafter be made on an embodiment of the present disclosure with reference to the drawings.

In this embodiment, a description will be made on an intake system 30 that supplies gas at least containing fresh air to an engine 1 using gasoline or the like as fuel with reference to FIG. 1 to FIG. 8.

Figure 1:
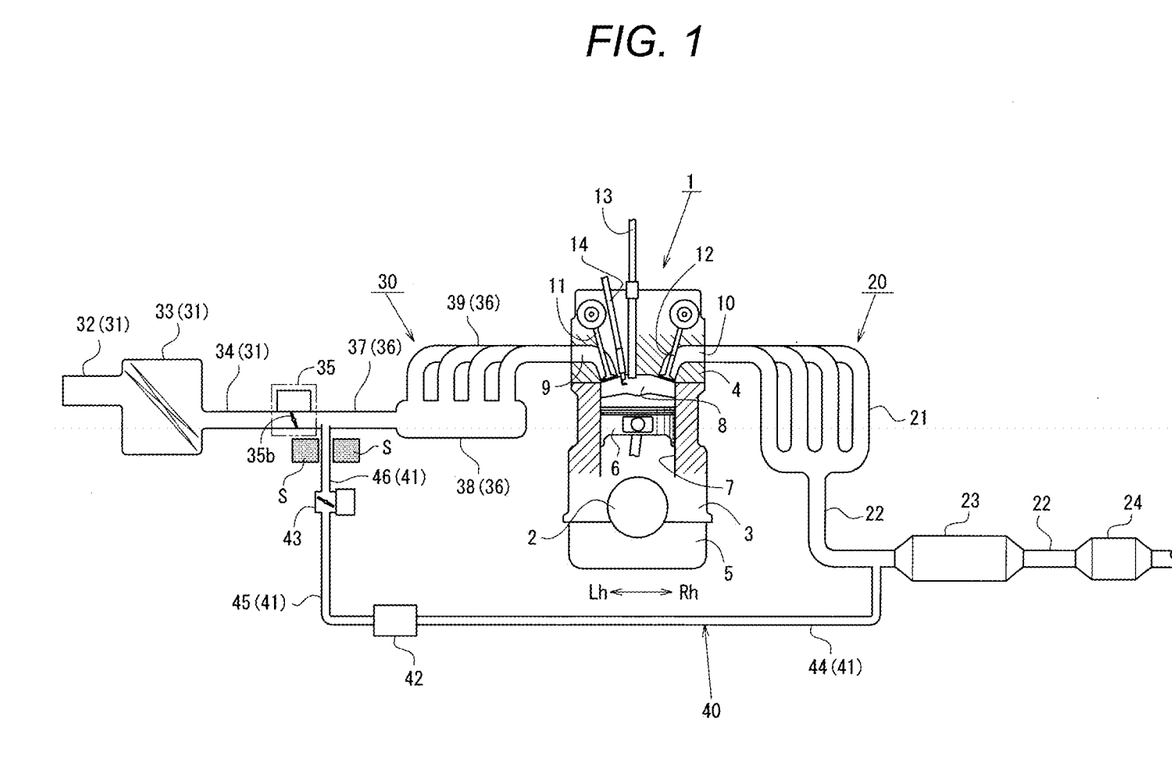
FIG. 1 is a system configuration diagram illustrating a configuration of an intake and exhaust system of an engine.
Figure 2:
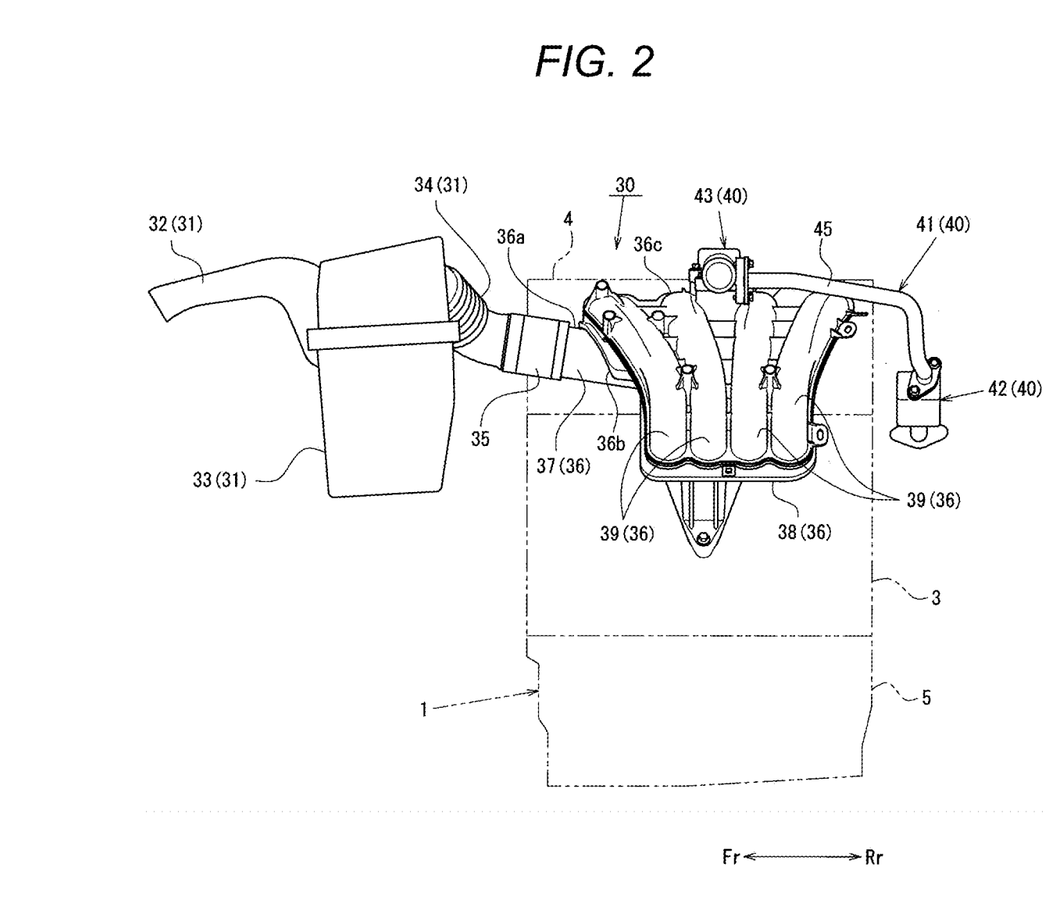
FIG. 2 is a side view illustrating external appearance of an intake system in a side view.
Figure 3:
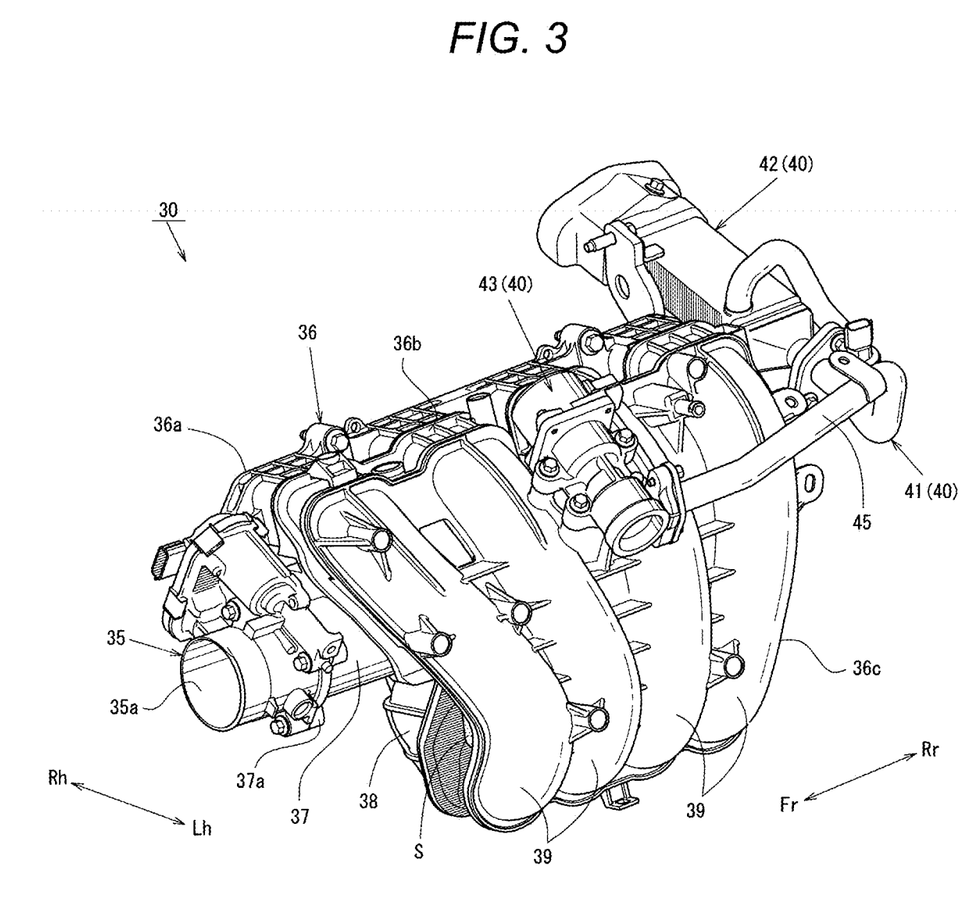
FIG. 3 is an external perspective view in which the external appearance of the intake system is seen from above and the front.
Figure 4:
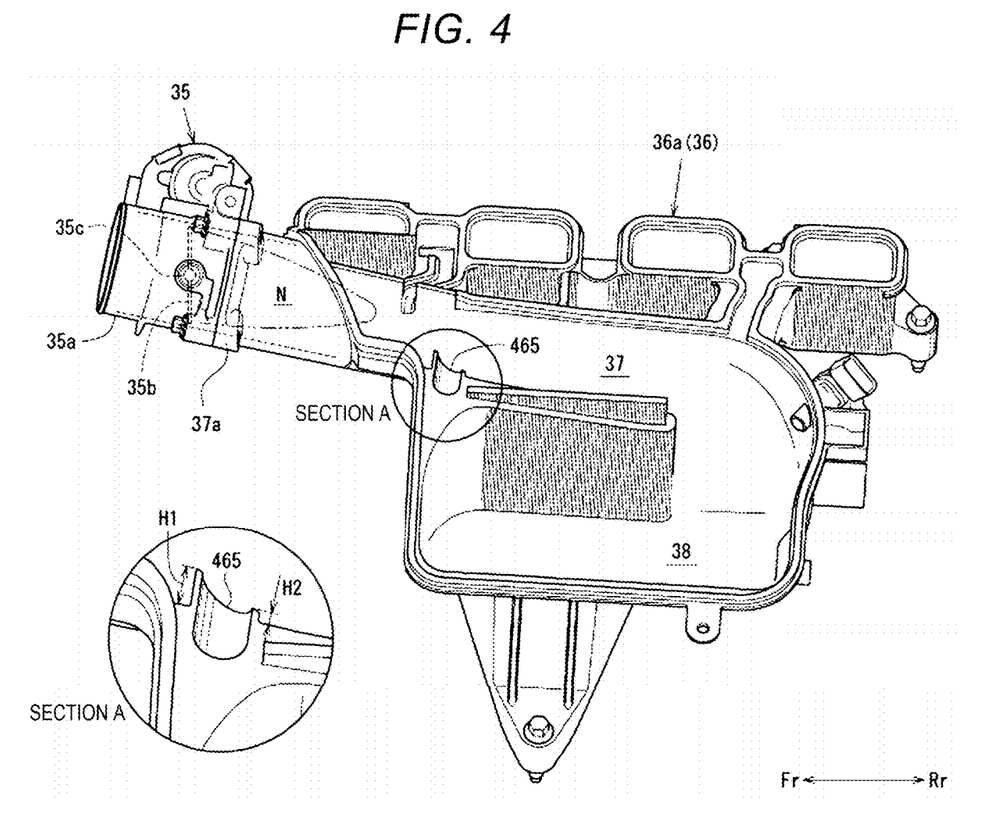
FIG. 4 is a side view illustrating external appearance of an inner divided body in a side view.

FIG. 1 is a system configuration diagram of an intake and exhaust system of the engine 1, FIG. 2 is a side view of the intake system 30, FIG. 3 is an external perspective view of the intake system 30, and FIG. 4 is a side view of an inner divided body 36a.

Figure 5:
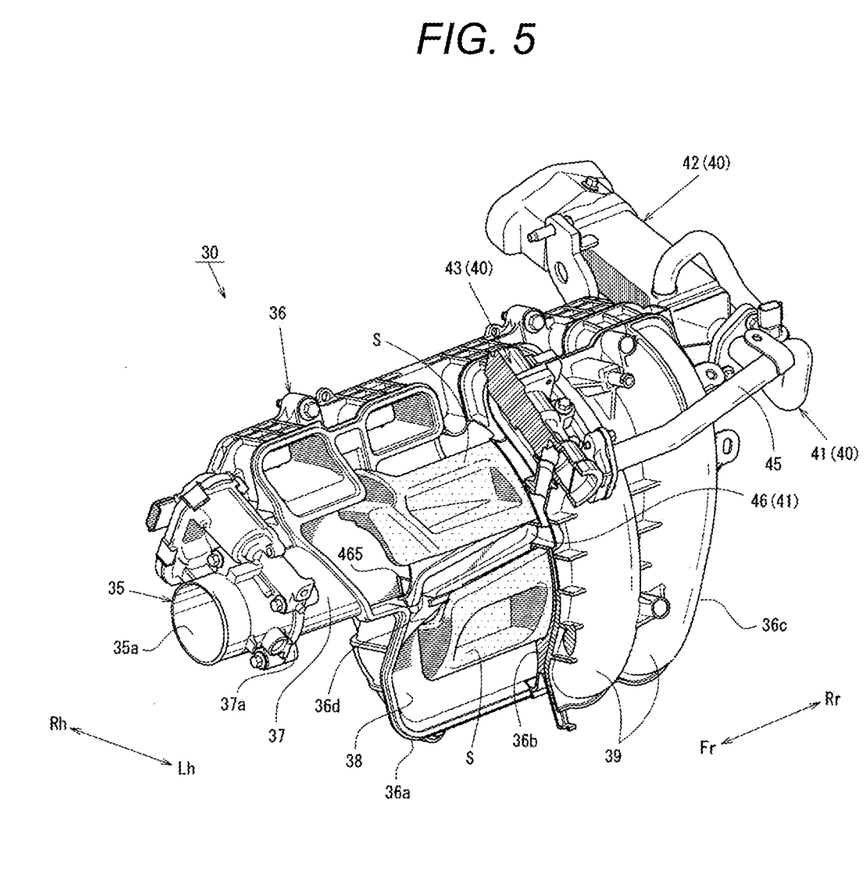
FIG. 5 is a cross-sectional perspective view illustrating a partial cross section of an EGR passage.
Figure 6:
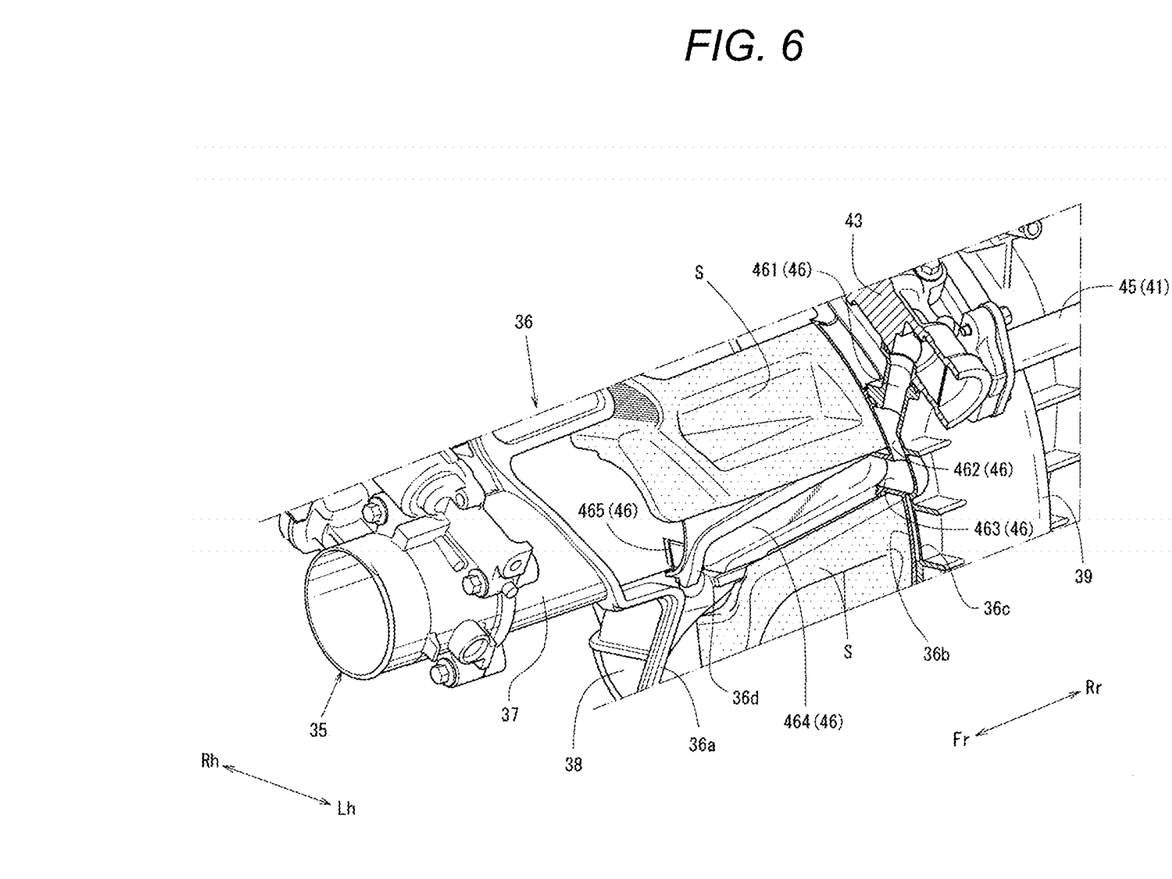
FIG. 6 is an enlarged cross-sectional perspective view of a main section in which a main section in FIG. 5 is enlarged.
Figure 7:
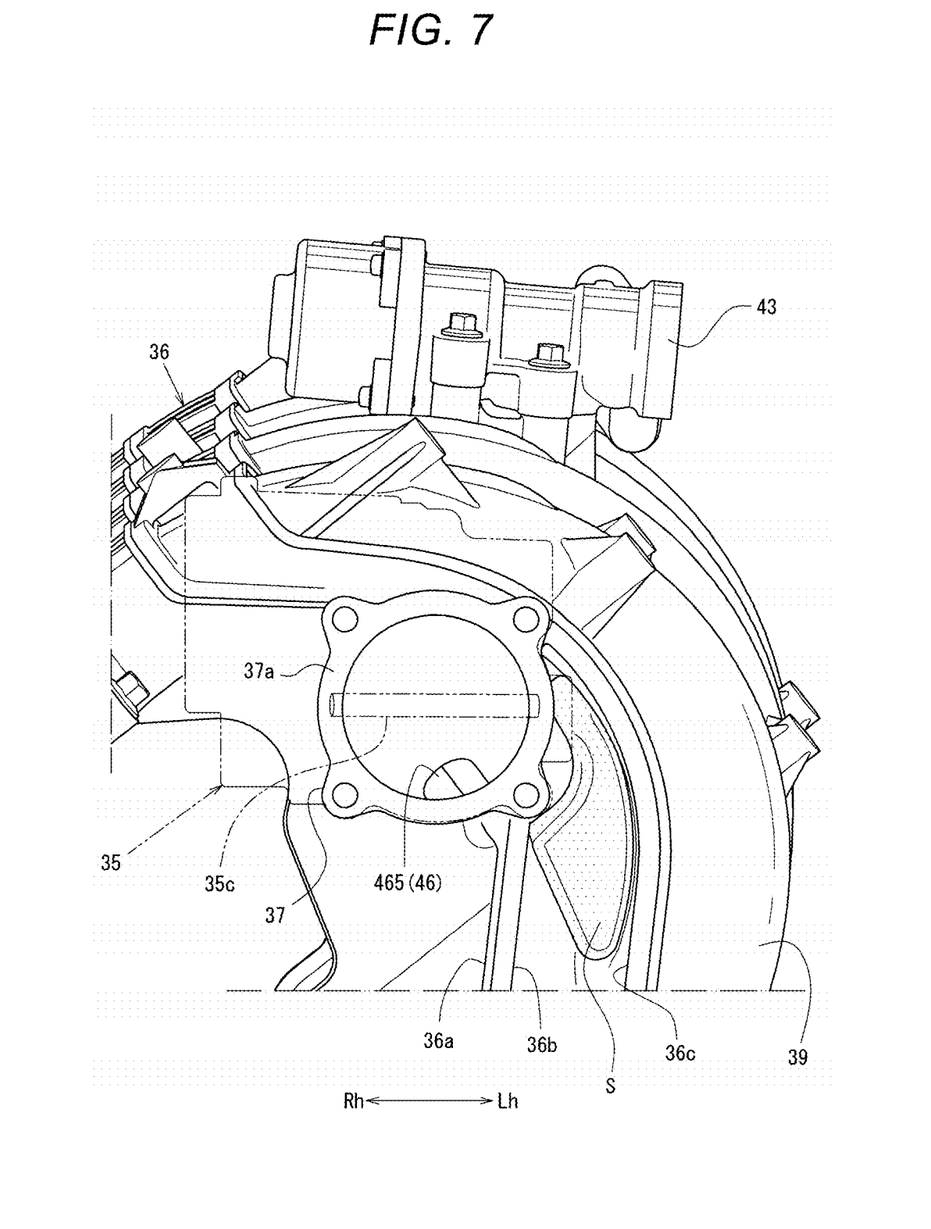
FIG. 7 is a front view illustrating external appearance of a projected section in a front view.
Figure 8:
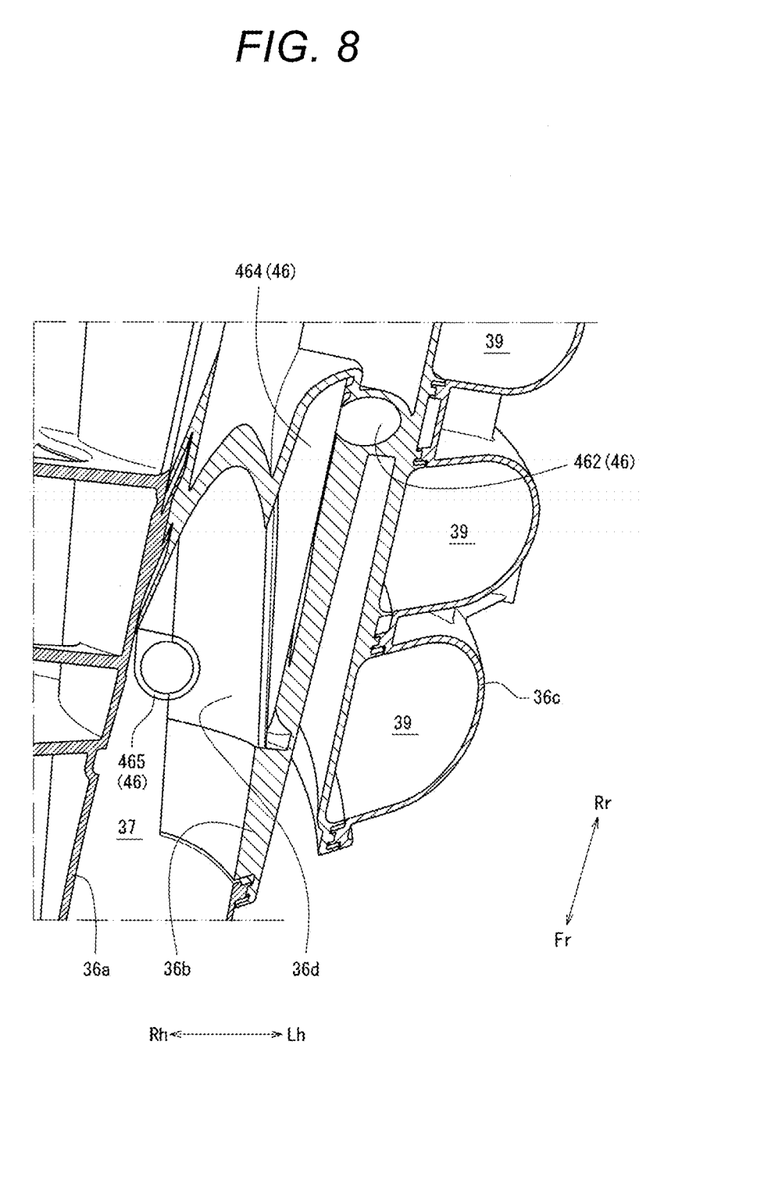
FIG. 8 is a plan view illustrating the external appearance of the projected section in a plan view.

Furthermore, FIG. 5 is a cross-sectional perspective view of an EGR passage 41, FIG. 6 is an enlarged cross-sectional perspective view of a main section in which a main section in FIG. 5 is enlarged, FIG. 7 is a front view of a projected section 465, and FIG. 8 is a plan view of the projected section 465.

In the drawings (e.g. FIG. 3), an arrow Fr and an arrow Rr indicate a longitudinal direction of the engine 1, the arrow Fr indicates the front, and the arrow Rr indicates the rear. Furthermore, an arrow Rh and an arrow Lh indicate a width direction of the engine 1, the arrow Rh indicates a right direction, and the arrow Lh indicates a left direction.

In order to clarify the illustration, the engine 1 is illustrated by two-dot chain lines in FIG. 2, and a throttle body 35 is illustrated by two-dot chain lines in FIG. 7.

First, the engine 1 is a so-called in-line four-cylinder engine in which four cylinders are disposed in series along an axial center of a crankshaft 2. As illustrated in FIG. 1, this engine 1 is configured to include: an engine block 3 that supports the crankshaft 2 in a freely rotatable manner; a cylinder head 4; a head cover (not illustrated); and an oil pan 5.

The cylinder head 4 is attached to an upper surface of the engine block 3, and the head cover is attached to an upper surface of the cylinder head 4. Furthermore, the oil pan 5 is attached to a lower surface of the engine block 3.

As illustrated in FIG. 1, in this engine 1, four each of cylinders 7 and combustion chambers 8 are formed along the longitudinal direction. Each of the cylinders 7 accommodates a piston 6 in a vertically slidable manner, and each of the combustion chambers 8 is a space including the cylinder 7, the piston 6, and the cylinder head 4.

Furthermore, as illustrated in FIG. 1, the cylinder head 4 of the engine 1 is formed with, for each of the cylinders 7: two intake ports 9, each of which communicates between the combustion chamber 8 and the outside of the engine 1; and two exhaust ports 10.

In addition, as illustrated in FIG. 1, the engine 1 includes, for each of the cylinders 7: intake valves 11 that open/close the intake ports 9; exhaust valves 12 that open/close the exhaust ports 10; a fuel injection injector 13 that injects the fuel into the combustion chamber 8; and an ignition plug 14 that ignites the fuel in the combustion chamber 8.

Here, a description will be made by setting a direction along the axial center of the crankshaft 2 in the engine 1 as the longitudinal direction of the engine 1 and setting a horizontal direction that is substantially orthogonal to the longitudinal direction in the front view as the width direction of the engine 1.

As illustrated in FIG. 1, in this engine 1, an exhaust system 20 connected to the exhaust ports 10 and the intake system 30 connected to the intake ports 9 are arranged to oppose each other in the width direction with the engine 1 being interposed therebetween.

The exhaust system 20 is disposed on a right side of the engine 1. As illustrated in FIG. 1, this exhaust system 20 is configured to include: an exhaust manifold 21 that is connected to each of the exhaust ports 10 of the engine 1; and a first catalyst 23, a second catalyst 24, and a silencer (not illustrated), each of which is connected to the exhaust manifold 21 via an exhaust pipe 22.

The first catalyst 23 is a three-way catalyst, for example. The second catalyst 24 is a gasoline particulate filter, for example.

Meanwhile, as illustrated in FIG. 1 and FIG. 2, the intake system 30 is configured to include an upstream intake passage 31, the throttle body 35, and a downstream intake passage 36 that are arranged on a left side of the engine 1. The intake system 30 further includes an exhaust gas recirculation system 40 (hereinafter referred to as an EGR system 40) that circulates some of exhaust gas into the downstream intake passage 36.

The upstream intake passage 31, the throttle body 35, and the downstream intake passage 36 are connected in this order from the front to the rear, and the EGR system 40 is connected to the downstream intake passage 36.

The upstream intake passage 31 is a passage having an internal space in which outside air is suctioned as the fresh air and flows into the throttle body 35. As illustrated in FIG. 1 and FIG. 2, this upstream intake passage 31 is configured that a first air duct 32, an air cleaner 33, and a second air duct 34 are connected in this order from the front to the rear.

The first air duct 32 is formed as a cylindrical body having an internal space through which the fresh air flows down.

The air cleaner 33 has a function of removing dust contained in the fresh air that is suctioned via the first air duct 32.

The second air duct 34 is a cylindrical body having an internal space through which the fresh air flows down, a front end thereof is connected to the air cleaner 33, and a rear end thereof is connected to the throttle body 35.

As illustrated in FIG. 1 and FIG. 2, the throttle body 35 has a function of regulating a flow rate of the fresh air that flows down from the upstream intake passage 31 to the downstream intake passage 36.

More specifically, the throttle body 35 includes: a hollow case 35a that communicates with the upstream intake passage 31 and the downstream intake passage 36; a throttle valve 35b that can freely open/close an internal space of the case 35a; and a valve shaft 35c that supports the throttle valve 35b (see FIG. 4).

The downstream intake passage 36 is a branch pipe, a so-called intake manifold, through which the gas at least containing the fresh air is introduced into the intake ports 9 of the engine 1. The downstream intake passage 36 is integrally formed with a surge tank 38 that stabilizes a flow velocity of the gas at least containing the fresh air.

As illustrated in FIG. 3 to FIG. 5, this downstream intake passage 36 is configured by joining the inner divided body 36a, an intermediate divided body 36b, and an outer divided body 36c, each of which is made of a synthetic resin having heat resistance such as an engineering plastic, for example. In a substantially vertical cross section along the longitudinal direction, these inner divided body 36a, intermediate divided body 36b, and outer divided body 36c are formed in such a shape of dividing the downstream intake passage 36.

By joining the inner divided body 36a, the intermediate divided body 36b, and the outer divided body 36c in the width direction, the downstream intake passage 36 defines an internal space that communicates between the internal space of the throttle body 35 and the intake ports 9 of the engine 1.

As illustrated in FIG. 5, a channel component 36d that constitutes an EGR passage 41 (a third EGR passage 46 and the projected section 46b, which will be described later) is held between the inner divided body 36a and the intermediate divided body 36b.

In detail, as illustrated in FIG. 2 to FIG. 5, the internal space of the downstream intake passage 36, which communicates between the internal space of the throttle body 35 and the intake ports 9 of the engine 1, is defined by a fresh air introduction passage 37, the surge tank 38, and four independent intake pipes 39.

The fresh air introduction passage 37, the surge tank 38, and the independent intake pipes 39 are disposed in this order from the throttle body 35 to the engine 1. In other words, the fresh air introduction passage 37, the surge tank 38, and the independent intake pipes 39 are disposed in this order from an upstream side to a downstream side of a flow of the gas at least containing the fresh air.

As illustrated in FIG. 2 to FIG. 5, in regard to the fresh air introduction passage 37, a passage extending in the longitudinal direction is constructed of the inner divided body 36a and the intermediate divided body 36b, which are joined to each other in the width direction, at a position below the intake ports 9 of the engine 1 in a manner to have a longitudinal length reaching a rear portion of the engine 1. As illustrated in FIG. 3 and FIG. 4, the fresh air introduction passage 37 is fastened to the throttle body 35 via a flange section 37a that is provided at a front end thereof.

As illustrated in FIG. 3 to FIG. 5, in the surge tank 38, a space extends forward from a rear end of the fresh air introduction passage 37 that is curved downward, and is defined by the inner divided body 36a and the intermediate divided body 36b that are joined to each other in the width direction.

As illustrated in FIG. 3 to FIG. 5, each of the four independent intake pipes 39 is a passage that independently couples the surge tank 38 and the intake port 9 of the engine 1. Each of these independent intake pipes 39 is formed in a shape that is curved upward to the left in the width direction from a lower portion of the surge tank 38 in a manner to cross the fresh air introduction passage 37 and in which a tip thereof is located above the fresh air introduction passage 37.

More specifically, a portion of the independent intake pipe 39 that is curved upward to the left in the width direction from the lower portion of the surge tank 38 is constructed of the intermediate divided body 36b and the outer divided body 36c, and a portion thereof located above the fresh air introduction passage 37 is constructed of the inner divided body 36a, the intermediate divided body 36b, and the outer divided body 36c.

The independent intake pipe 39 is formed in the curved shape that passes a position separated from the fresh air introduction passage 37 by a specified clearance on the left side in the width direction. As illustrated in FIG. 5, in the intermediate divided body 36b that constitutes a portion between the fresh air introduction passage 37 and the independent intake pipes 39, two sound insulators S, each of which is a porous member having a sound insulating property and a heat retaining property, are disposed.

More specifically, as illustrated in FIG. 5 and FIG. 6, the two sound insulators S are disposed above and below a third exhaust gas introduction passage 463 and a fourth exhaust gas introduction passage 464 of the third EGR passage 46 while holding the third exhaust gas introduction passage 463 and the fourth exhaust gas introduction passage 464 therebetween.

As illustrated in FIG. 1 to FIG. 3, the EGR system 40 is configured to include the EGR passage 41, an EGR cooler 42, and an EGR valve 43.

The EGR passage 41 connects the exhaust system 20 and the downstream intake passage 36 so as to circulate some of the exhaust gas flowing toward the first catalyst 23 into the fresh air introduction passage 37.

The EGR cooler 42 is a cooler of a water-cooling type, for example, and cools the exhaust gas to be circulated into the downstream intake passage 36. As illustrated in FIG. 2, this EGR cooler 42 disposed near the rear portion of the engine 1.

The EGR valve 43 is an on-off valve that regulates a flow rate of the exhaust gas to be circulated into the downstream intake passage 36. As illustrated in FIG. 2 and FIG. 3, this EGR valve 43 is fastened and fixed to a portion of the downstream intake passage 36 between the second independent intake pipe 39 and the third independent intake pipe 39 from a front side of the engine 1.

The description will continue on the EGR passage 41 of the above-described EGR system 40.

As illustrated in FIG. 1 to FIG. 3, the EGR passage 41 is configured to include: a first EGR passage 44 that connects the exhaust system 20 and the EGR cooler 42; a second EGR passage 45 that connects the EGR cooler 42 and the EGR valve 43; and the third EGR passage 46 that connects the EGR valve 43 and the fresh air introduction passage 37.

Of these, as illustrated in FIG. 5 and FIG. 6, the third EGR passage 46 is constructed of the space provided in the downstream intake passage 36.

More specifically, as illustrated in FIG. 5 and FIG. 6, the third EGR passage 46 is configured to include a first exhaust gas introduction passage 461, a second exhaust gas introduction passage 462, the third exhaust gas introduction passage 463, the fourth exhaust gas introduction passage 464, and the projected section 465 that is projected to an internal space of the fresh air introduction passage 37.

As illustrated in FIG. 6, the first exhaust gas introduction passage 461 is constructed of a cylindrical body that is integrally formed with the outer divided body 36c. This first exhaust gas introduction passage 461 is formed in a shape that extends substantially downward and to the right in the width direction from the EGR valve 43.

As illustrated in FIG. 6, the second exhaust gas introduction passage 462 is constructed of the outer divided body 36c and the intermediate divided body 36b. This second exhaust gas introduction passage 462 is formed in a shape that extends substantially downward along the independent intake pipe 39 from the first exhaust gas introduction passage 461.

As illustrated in FIG. 6, the third exhaust gas introduction passage 463 is constructed of a cylindrical body that is integrally formed with the intermediate divided body 36b. This third exhaust gas introduction passage 463 is formed in a shape that extends to the right in the width direction from the second exhaust gas introduction passage 462.

As illustrated in FIG. 6, the fourth exhaust gas introduction passage 464 is constructed of the channel component 36d and the intermediate divided body 36b. This fourth exhaust gas introduction passage 464 is formed in a shape that extends forward along the fresh air introduction passage 37 from the third exhaust gas introduction passage 463.

As illustrated in FIG. 6, the third exhaust gas introduction passage 463 and the fourth exhaust gas introduction passage 464, which have been described above, are covered with the two sound insulators S provided between the fresh air introduction passage 37 and the independent intake pipes 39.

As illustrated in FIG. 4 and FIG. 6, the projected section 465 is configured to communicate with the fourth exhaust gas introduction passage 464 by the inner divided body 36a and the channel component 36d. As illustrated in FIG. 7, when seen in a downflow direction that is a flow direction of the fresh air from the throttle valve 35b toward the fresh air introduction passage 37, this projected section 465 is formed to have a projected shape in a direction that crosses an axial direction of the valve shaft 35c. Moreover, as will be discussed in greater detail below, at least a portion of the projected section 465 that is closest to the throttle valve 35b extends beyond the sidewalls of the fresh air introduction passage 37 and into an interior of the fresh air introduction passage 37.

In detail, as illustrated in FIG. 4, FIG. 6, and FIG. 8, in a portion of the fresh air introduction passage 37 on an upstream side of a substantially central portion in the downflow direction, the projected section 465 is formed in a substantially cylindrical shape that is projected from an inner surface of the fresh air introduction passage 37 and into an interior space of the fresh air introduction passage 37. As illustrated in FIG. 4, the projected section 465 is formed at a position on a downstream side of a negative-pressure region N (an area surrounded by a two-dot chain line in FIG. 4) that is generated adjacent to a downstream side of the throttle valve 35b and has a relatively negative pressure due to the flow of the fresh air that has flowed through the throttle valve 35b.

Furthermore, as illustrated in FIG. 4, the projected section 465 is formed in a substantially cylindrical shape in which a projection length as a height along a projected direction from the inner surface of the fresh air introduction passage 37 is gradually reduced from the upstream side to the downstream side.

More specifically, as illustrated in FIG. 4, in the side view, the projected section 465 is formed in a substantially cylindrical shape, or alternatively a half cylindrical shape, or other partial cylindrical shape with less that a full radius (e.g., anywhere from 90 degrees to 360 degrees at the entrance to the fresh air introduction passage 37, and less as the projected section 465 extends further into the fresh air introduction passage 37) in which a projection length H1 on an outer circumferential surface on the upstream side is longer than a projection length H2 on the outer circumferential surface on the downstream side. Moreover, the partial cylindrical shape at the distance H2 has a cross section that is a greater percentage of a full circle than a cross section of the projected portion 465 at the end (i.e., at the distance H1). As an example, the cross section of the partial cylindrical shape of the projected portion 465 at H2 might be 180 degrees of a circle, while the cross section at H1 is less than 180 degrees, such as 90 degrees or even 5 degrees. As illustrated in FIG. 4 and FIG. 8, this projected section 465 is formed such that, when the projection length H1 is set to be about a half of a rotation radius of the throttle valve 35b, a tip of the projected section 465 does not overlap the valve shaft 35c when viewed from the downflow direction.

As it has been described so far, the intake system 30 of the engine 1, which supplies the gas at least containing the fresh air to each of the cylinders 7 in the engine 1, includes: the throttle valve 35b that regulates an intake amount of the fresh air; and the downstream intake passage 36 having the internal space in which the fresh air having flowed through the throttle valve 35b is introduced into the cylinders of the engine 1. The intake system 30 of the engine 1 further includes the EGR passage 41 that communicates with the internal space of the downstream intake passage 36 and introduces some of the exhaust gas as the EGR gas into the downstream intake passage 36. The EGR passage 41 includes the projected section 465 in the substantially polygonal or cylindrical shape that is projected to the internal space of the downstream intake passage 36. The projected section 465 is formed to have the shape in which the projection length H1 on the outer circumferential surface on the upstream side is longer than the projection length H2 on the outer circumferential surface on the downstream side.

In this way, the intake system 30 of the engine 1 can inhibit a backflow flux of the EGR gas toward the throttle valve 35b by controlling (e.g., mechanically controlling or blocking a backflow of) the flux of the EGR gas in the internal space of the downstream intake passage 36.

More specifically, the projected section 465 of the EGR passage 41 is formed in a substantially polygonal or partial cylindrical shape (e.g., gutter shape when viewed in cross-section, where a surface of the partial cylindrical shape decreases as the projected section 465 extends further toward its outermost end) in which the projection length H1 on the outer circumferential surface on the upstream side is longer than the projection length on a downstream lateral surface. Accordingly, in the projected section 465 of the EGR passage 41, the upstream lateral surface can function as a protective wall against the negative-pressure region N that is generated adjacent to the throttle valve 35b.

As a result, even in the case where the projected section 465 of the EGR passage 41 is provided at the position near the throttle valve 35b, the intake system 30 of the engine 1 can inhibit the EGR gas from being drawn to the negative-pressure region N. Thus, the intake system 30 of the engine 1 can introduce the EGR gas into the downstream intake passage 36 in a manner to flow along the flow of the fresh air that flows down toward the downstream portion of the downstream intake passage 36.

Therefore, the intake system 30 of the engine 1 can inhibit the flux of the EGR gas toward the throttle valve 35b by controlling the flux of the EGR gas in the internal space of the downstream intake passage 36. Furthermore, the projected section 465 of the EGR passage 41 can be provided in the further upstream portion of the downstream intake passage 36. Therefore, compared to a case where the projected section 465 of the EGR passage 41 is provided in the downstream portion of the downstream intake passage 36, the intake system 30 of the engine 1 can further reliably mix the fresh air and the EGR gas.

In addition, since the projected section 465 of the EGR passage 41 is formed in the substantially cylindrical shape (or partial cylindrical shape), the intake system 30 of the engine 1 can cause the fresh air to smoothly flow down along the circumferential surface of the projected section 465. Thus, compared to the projected section 465 in a substantially rectangular shape, for example, the intake system 30 of the engine 1 can suppress intake resistance of the fresh air.

Furthermore, since the negative-pressure region N is generated on the downstream side of the projected section 465 by the flow of the fresh air, the intake system 30 of the engine 1 can reliably deliver the EGR gas from the projected section 465 toward the downstream side of the downstream intake passage 36.

Therefore, the intake system 30 of the engine 1 can further inhibit the flux of the EGR gas toward the throttle valve 35b and can reliably cause the EGR gas, which is introduced into the downstream intake passage 36, to flow down to the downstream portion of the downstream intake passage 36.

In a downflow view that is seen in the downflow direction, the projected section 465 of the EGR passage 41 is formed to be projected in the direction that crosses a valve shaft direction and to have the projection length that does not overlap the valve shaft 35c.

As a result, in the downflow view, in the intake system 30 of the engine 1, it is possible to suppress a ratio of an area of the projected section 465 to an opening area of the downstream intake passage 36 to be low. Therefore, the intake system 30 of the engine 1 can further suppress the intake resistance of the fresh air.

Furthermore, the projection length of the projected section 465 can be suppressed in comparison with the projected section 465 having a projection length that overlaps the valve shaft 35c in the downflow view. Thus, in the intake system 30 of the engine 1, the tip of the projected section 465 can be positioned near the circumferential surface of the downstream intake passage 36 where the flow velocity of the fresh air is relatively high.

As a result, the intake system 30 of the engine 1 can reliably merge the EGR gas with the flow of the fresh air toward the downstream portion of the downstream intake passage 36 at a relatively high flow velocity.

Therefore, the intake system 30 of the engine 1 can further reliably cause the EGR gas, which is introduced into the downstream intake passage 36, to flow down to the downstream portion of the downstream intake passage 36.

Moreover, since the sound insulators S, each of which covers the EGR passage 41, are provided, the heat in the EGR passage 41 can be retained in the intake system 30 of the engine 1. Thus, it is possible to introduce the EGR gas, a temperature of which is suppressed from being reduced, toward the downstream portion of the downstream intake passage 36.

In this way, the intake system 30 of the engine 1 can further suppress condensation of moisture contained in the EGR gas in the downstream intake passage 36. Therefore, the intake system 30 of the engine 1 can further reliably introduce the EGR gas containing the moisture into the cylinders of the engine 1.

In correspondences between the configuration of the present disclosure and that of the above-described embodiment, the intake passage in the present disclosure corresponds to the downstream intake passage 36 in the embodiment, similarly, the projection length on the upstream lateral surface corresponds to the projection length H1 on the outer circumferential surface on the upstream side, the projection length on the downstream lateral surface corresponds to the projection length H2 on the outer circumferential surface on the downstream side, and the porous member corresponds to the sound insulator S, but the present disclosure is not only limited to the configuration in the above-described embodiment but can be implemented in various embodiments.

For example, in the above-described embodiment, the engine 1 is an in-line four-cylinder engine. However, the engine 1 is not limited thereto, and may be an in-line six-cylinder engine, a V-type multi-cylinder engine, a single-cylinder engine, or the like. The engine 1 may be vertically arranged or horizontally arranged.

The downstream intake passage 36 is made of the synthetic resin. However, the downstream intake passage 36 is not limited thereto and may be a downstream intake passage that is made of metal.

The downstream intake passage 36 includes the surge tank 38. However, the downstream intake passage 36 is not limited thereto and may be a downstream intake passage that does not include the surge tank 38.

The third EGR passage 46 is constructed of the space provided in the downstream intake passage 36. However, the third EGR passage 46 is not limited thereto and may be a third EGR passage that is constructed of a different pipe from the downstream intake passage 36.

At this time, the projected section may be constructed of the tip of the third EGR passage that is inserted in the fresh air introduction passage 37 of the downstream intake passage 36. Alternatively, it may be configured to insert the third EGR passage, which constructed of a different body, in the projected section integrally formed with the fresh air introduction passage 37.

The projected section 465 has the substantially cylindrical shape (or partial cylindrical shape). However, the projected section 465 is not limited thereto, and may be a projected section in a polygonal cylindrical shape, for example, as long as the projection length H1 on the upstream lateral surface is longer than the projection length H2 on the downstream lateral surface.

The third exhaust gas introduction passage 463 and the fourth exhaust gas introduction passage 464 of the EGR passage 41 are configured to be covered with the sound insulators S. However, the third exhaust gas introduction passage 463 and the fourth exhaust gas introduction passage 464 may be covered with a sound absorbing material or a thermal insulator as long as the sound absorbing material or the thermal insulator is the porous member having the heat retaining property.

DESCRIPTION OF REFERENCE SIGNS AND NUMERALS

1: Engine
7: Cylinder
30: Intake system
35b: Throttle valve
35c: Valve shaft
36: Downstream intake passage
41: EGR passage
465: Projected section
H1: Projection length on outer circumferential surface on upstream side
H2: Projection length on outer circumferential surface on downstream side
S: Sound insulator

The invention claimed is:

1. An engine intake system supplies gas containing fresh air to a cylinder of an engine, the engine intake system comprising:
    a throttle valve that regulates an intake amount of the fresh air;
    an intake passage having an internal space in which the fresh air that passed through the throttle valve is introduced into the cylinder of the engine; and
    an EGR passage that communicates with the internal space of the intake passage and introduces at least some exhaust gas as EGR gas into the intake passage, wherein
    the EGR passage includes a projected section having a substantially polygonal or at least partially cylindrical shape that extends into the internal space of the intake passage, and
    an upstream lateral surface of the projected section has a projection length that is longer than a projection length on a downstream lateral surface of the projected section.

2. The engine intake system according to claim 1, wherein the projected section of the EGR passage has an at least a partial cylindrical shape.

3. The engine intake system according to claim 2, wherein the at least the partial cylindrical shape is a substantially cylindrical shape.

4. The engine intake system according to claim 2, wherein the at least partial cylindrical shape has a first portion that is closer to a wall of the intake passage than a second portion that is toward an end of the projected section disposed further into the internal space of the intake passage, and
    a cross section of the first portion being a greater percentage of a circle than a cross section of the second portion.

5. The engine intake system according to claim 1, wherein:
    a direction along a valve shaft of the throttle valve is set as a valve shaft direction, and
    the projected section of the EGR passage is formed to project in a direction that crosses the valve shaft direction and to have a projection length that does not overlap the valve shaft under a condition that a downstream portion of the intake passage is seen from the throttle valve.

6. The engine intake system according to claim 2, wherein:
    a direction along a valve shaft of the throttle valve is set as a valve shaft direction, and
    the projected section of the EGR passage is formed to project in a direction that crosses the valve shaft direction and to have a projection length that does not overlap the valve shaft under a condition that a downstream portion of the intake passage is seen from the throttle valve.

7. The engine intake system according to claim 4, wherein:
    a direction along a valve shaft of the throttle valve is set as a valve shaft direction, and
    the projected section of the EGR passage is formed to project in a direction that crosses the valve shaft direction and to have a projection length that does not overlap the valve shaft under a condition that a downstream portion of the intake passage is seen from the throttle valve.

8. The engine intake system according to claim 1, further comprising:
a porous member that covers the EGR passage.

9. The engine intake system according to claim 2, further comprising:
a porous member that covers the EGR passage.

10. The engine intake system according to claim 4, further comprising:
a porous member that covers the EGR passage.

11. The engine intake system according to claim 5, further comprising:
a porous member that covers the EGR passage.

12. The engine intake system according to claim 1, wherein:
the internal space of the intake passage communicates between a throttle body that includes the throttle valve and an intake port of the engine, and
the internal space of the intake passage includes a fresh air introduction passage, a surge tank, and at least one intake pipe.

13. The engine intake system according to claim 12, wherein:
the intake passage comprises an inner divided body, an intermediate divided body, and an outer divided body, each of the inner divided body, the intermediate divided body, and the outer divided body comprising a synthetic resin having heat resistance,
the ERG passage includes a channel positioned between the inner divided body and the intermediate divided body, and
the channel is configured to communicate with the projected section.

14. The engine intake system according to claim 12, wherein
the projected section extends in the internal space of the intake passage in a direction that crosses an axial direction of a throttle valve shaft in a downflow direction of the fresh air from the throttle valve toward the fresh air introduction passage.

15. An engine intake system supplies gas containing at least fresh air to a cylinder of an engine, the engine intake system comprising:
a throttle valve that regulates an intake amount of the fresh air;
an intake passage having an internal space in which the fresh air that passed through the throttle valve is introduced into the cylinder of the engine; and
an EGR passage that communicates with the internal space of the intake passage and introduces at least some exhaust gas as EGR gas into the intake passage, wherein
the EGR passage includes a projected section having a substantially polygonal shape that extends into the internal space of the intake passage, and
an upstream lateral surface of the projected section has a projection length that is longer than a projection length on a downstream lateral surface of the projected section.

16. The engine intake system according to claim 15, wherein:
a direction along a valve shaft of the throttle valve is set as a valve shaft direction, and
the projected section of the EGR passage is formed to project in a direction that crosses the valve shaft direction and to have a projection length that does not overlap the valve shaft under a condition that a downstream portion of the intake passage is seen from the throttle valve.

17. The engine intake system according to claim 15, further comprising:
a porous member that covers the EGR passage.

18. An engine intake system supplies gas containing at least fresh air to a cylinder of an engine, the engine intake system comprising:
a throttle valve that regulates an intake amount of the fresh air;
an intake passage having an internal space in which the fresh air that passed through the throttle valve is introduced into the cylinder of the engine; and
an EGR passage that communicates with the internal space of the intake passage and introduces at least some exhaust gas as EGR gas into the intake passage, wherein
the EGR passage includes means for inhibiting a backflow of the EGR gas toward the throttle valve.

19. The engine intake system of claim 18, wherein:
the means for inhibiting a backflow of the EGR gas toward the throttle valve includes means for blocking a backflow of the EGR gas from reaching the throttle valve.

20. The engine intake system of claim 18, wherein:
the means for inhibiting comprises means for preventing the throttle valve from being frozen in a sub-zero temperature by moisture in the EGR gas that is introduced by the EGR passage.

* * * * *